Aug. 21, 1951     D. W. GARDINER ET AL     2,565,219
SAIL AND METHOD OF MANUFACTURE OF SAME
Filed May 15, 1946     2 Sheets—Sheet 1

INVENTORS
DONALD W. GARDINER AND
BY   WILLIAM W. SLATER

J Edwin Coates
ATTORNEY

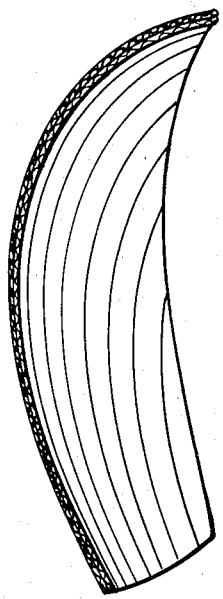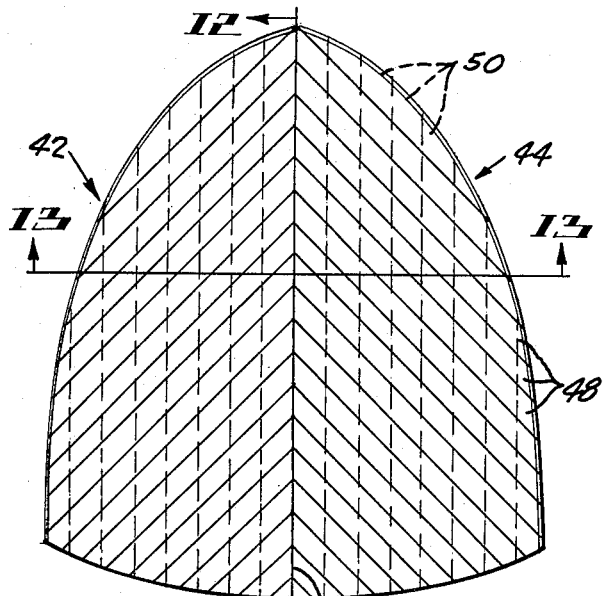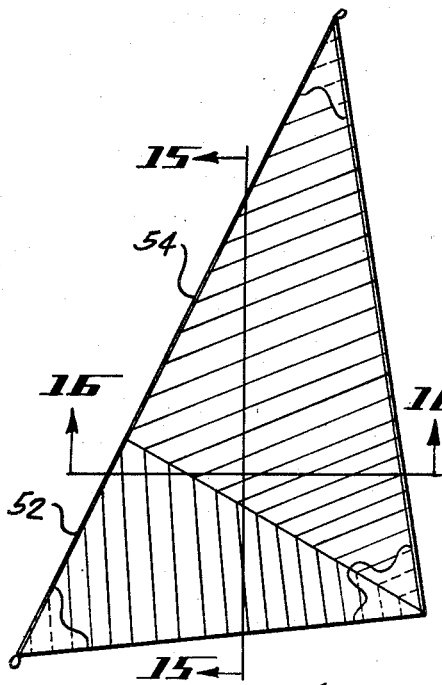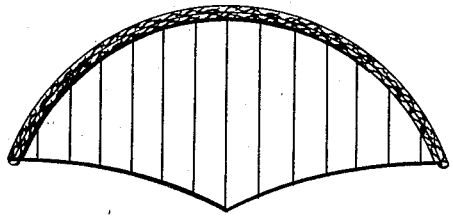

Patented Aug. 21, 1951

2,565,219

UNITED STATES PATENT OFFICE 2,565,219

SAIL AND METHOD OF MANUFACTURE OF SAME

Donald W. Gardiner, Hermosa Beach, and William W. Slater, Palos Verdes Estates, Calif.

Application May 15, 1946, Serial No. 669,886

8 Claims. (Cl. 154—116)

This invention relates to sails and more particularly to a unique method of constructing sails and to a type of sail which is structurally different from and superior to those now available.

In the construction of a sail in the conventional manner, for example a main sail, a series of strips of sail cloth of uniform width are laid out on a table or other level surface, one of the strips angling upwardly and rearwardly from the tack toward the leech margin and the other strips lying parallel thereto in edge-overlapping relation. Two adjacent strips are then stretched in position to the desired tension and match marked, after which they may be machine sewed with the match marks in proper alignment. The next adjacent strip may then be tensioned and matchmarked with the sewed strips and sewed to the margin of one of them, continuing in the same manner until all strips are fastened together.

After this sewing operation the ends of the strips are so cut as to provide a continuous convex curve on the leech edge, and in most cases a similar curve is formed on the luff and the foot. The edges are then folded over and reinforced and the luff and foot are sewed to ropes.

Such a sail is, of course, normally flat and consequently does not present the correct curvature for the flow of wind thereover in sailing. The tension in the ropes tends to pull the luff and foot straight, resulting in a slight "bagginess" in the central portion of the sail because of the original convex curve of these edges mentioned above. This, combined with the normal stretch of the fabric of the sail cloth, produces a curvature which is helpful but which is seldom, if ever, correct, and which cannot be relied on to remain the same thruout the useful life of the sail. In many cases the results are so unsatisfactory that it is necessary to take the sail apart and rebuild it one or more times in an effort to obtain the desired result.

One of the principle aims of the present invention is to produce a sail with a "built-in" three dimensional curvature which is aerodynamically correct and which will remain correct throughout the useful life of the sail. The invention also contemplates a novel method of manufacture by which the desired curvature may be secured with uniform results in each sail produced. It is also possible, in following the teachings of the invention, to produce a sail in which the bolt rope, head, tack, and clew are all integral with the main body of the sail.

The above ends are accomplished primarily by providing a mold or form substantially co-extensive with the area of the sail to be made and having a three dimensional curvature of correct aerodynamic form for the use to which the sail is to be put. On this form are laid a plurality of strips of cloth which may be conventional sail cloth or other fabric including woven glass cloth. The glass material has the desirable characteristics of practically no stretch in the direction of the threads and very little stretch or deformability on the bias, as well as a very high strength to weight ratio. The strips are laid in marginal overlapping relation and at a desired angle to an edge of the sail. Because of the three dimensional curvature of the form, the amount of overlap of uniform width strips will vary along the length of each strip and accordingly the edges may be trimmed to provide uniform overlap. When the adjoining edges are attached together, the sail has a built-in airfoil shape of predetermined character and will retain it permanently.

Various other advantages and features of novelty will become apparent as the description proceeds. The invention in its presently preferred form is illustrated in the accompanying drawings in which:

Fig. 11 is an elevational view of a spinnaker made in accordance with certain of the teachings of the invention;

Fig. 12 is a sectional view taken on line 12—12 of Fig. 11;

Fig. 13 is a sectional view taken on line 13—13 of Fig. 11;

Fig. 14 is an elevational view of a jib made in accordance with certain of the teachings of the invention;

Fig. 15 is a sectional view taken on line 15—15 of Fig. 14; and,

Fig. 16 is a sectional view taken on line 16—16 of Fig. 14.

Figure 1:
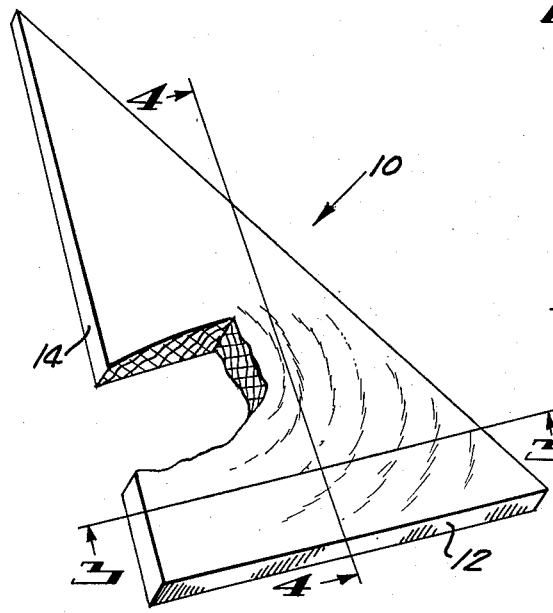
Fig. 1 is a perspective view of a mold or form over which the strips of material are laid in the course of manufacture.
Figure 3:
Fig. 3 is a sectional view taken on line 3—3 of Fig. 1.
Figure 4:
Fig. 4 is a sectional view taken on line 4—4 of Fig. 1.

The mold, or form, which is used in practising the invention is generally indicated at 10 in Fig. 1. The upper, or working, surface of the form is provided with a predetermined three dimensional curvature which is calculated to give the best aerodynamic results for a given type of duty. Altho this surface may be concave, it is preferably convex because it is desirable to pull the panels taut over its surface in the process of construction. Figs. 3 and 4 indicate the cross-sectional shape of the form in two of its dimensions and show the smooth, gradual curvature which is desired in the finished sail. The side walls 12, 14 are of any desired depth and the form may be mounted on a suitable support to bring it up to a convenient working level. The body of the form may be carved from wood or built up of plaster or other suitable material by any known method. After the form is completed it may be treated or coated with any desired suitable material to prevent the sail from sticking to it if the panels are joined by a cementing process as described below. Since the form has a three dimensional curvature of the correct aerodynamic shape for best performance, a sail which is made on it as described will also have permanently incorporated in it an aerodynamically correct, three dimensional curvature.

Figure 2:
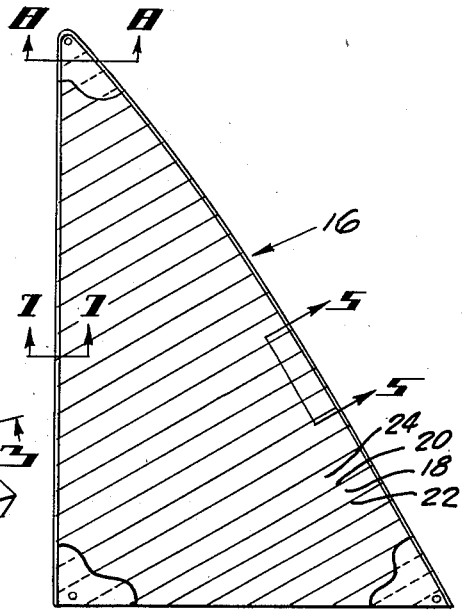
Fig. 2 is an elevational view of a main sail made in accordance with the present invention.

The sail 16, shown in Fig. 2, is made up of a plurality of panels of sail cloth with their principal axes laid generally parallel to each other and attached along their adjoining edges, each panel sloping upwardly and rearwardly as shown. It is desirable to have the seams or lines of jointure lie along lines defining the junctions of the curved surface of the form with a plurality of parallel vertical planes passing thru it. Since said planes are vertical, and since the corners of the curved portion of the mold are at a substantially uniform distance above the horizontal bottom surface of the base, the planes are perpendicular to a plane passing thru said corners which may be called the general plane of said sail. It will be seen that the general plane of the sail can be considered as the plane containing the corners of the sail itself. The actual width of a panel so defined varies from station to station along its length and hence must be tailored to fit. As an example, panel 18 is laid out in the position shown, extending from the tack to the leech edge. When in place it is pulled until it is taut and can be slightly deformed by such tension to correspond closely with the surface of the form in the corresponding area. The side edges of the panel are then trimmed to provide a uniform desired overlap along lines 20 and 22. The adjacent panel 24 is then laid in place and pulled taut in the same way and correspondingly trimmed to size. The seams between panels are shown diagrammatically in single line for clarity of illustration.

If conventional sail cloth, such as canvas duck, is used, match marks are then placed along the margins of the panels, or the margins may be pinned or stapled temporarily, and they are taken from the form and sewed together along the seam to provide the beginning of the sail. In the preferred form of the invention, a material is used comprising a plurality of threads of glass fiber woven into "cloth" similar in appearance to cotton cloth. This material has the very desirable properties for sails of being much stronger than cotton or linen and of being unaffected by water, salt spray, heat, aging, or deterioration by the rays of the sun.

Figure 5:
Fig. 5 is a sectional view taken on line 5—5 of Fig. 2 showing the presently preferred arrangement of the panels.

To avoid the necessity for sewing the seams, the margins of the panels may be coated with a layer of a polyvinyl resin or any other known heat sealing plastic. The panels can then be joined while in place on the form by pressing the seams with a hot iron which "welds" the edges together. A sequence of panels thus joined will appear in cross section as indicated in Fig. 5, in which the thickness of the panels is greatly exaggerated for clarity. If desired, this method of joining seams may also be applied to conventional sail cloth. Each of the other panels is prepared and joined in the same way until the entire sail is completed, and the finished product will incorporate the predetermined aerodynamic curvature built into the form. When the entire sail is completed it is then removed from the form and is ready for immediate use.

Instead of treating only the margins, the entire surface of the material on one or both sides may advantageously be coated with a polyvinyl resin or other compound, such as those now available under the trade names "Vinylite," "Kordosol" and "Koroseal," which will render the cloth impervious to the passage of air therethru. The use of these materials will add greatly to the life of conventional sail cloth by protecting it from the effects of salt water, as well as providing a means for heat sealing the seams.

After the panels are all joined together as described above, the edges may be folded over on themselves and heat sealed to form a hem which strengthens the margins of the sail. By the process about to be described, the filamentary strand 26 which serves as the bolt rope, or other line, may be incorporated as an integral part of the sail.

The strand or rope, which may be hemp, linen, wire, etc., as in present practise, or glass fiber, is first stretched by applying a load at least equal to any which will be applied in use. While in the stretched condition it is impregnated with a compound such as "Vinylite," "Kordosol" or "Koroseal" and kept taut until the compound has dried. Preferably, sufficient material is applied to produce a substantially smooth cylindrical surface. Since the material fills all of the interstices in the rope, is highly resistant to compression, and holds the individual fibers fixed in relation to each other, it substantially prevents shortening of the rope on release of the tension.

Figure 7:
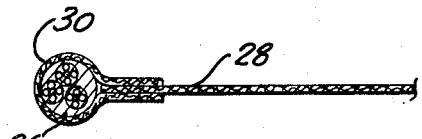
Fig. 7 is a sectional view taken on line 7—7 of Fig. 2.

The bolt rope 26, after being treated as above described, is laid along the luff and/or foot edges of the sail 28. A hem, or reinforcing strip, 30, is then folded over the rope and the edge of the sail as shown in Fig. 7. Upon application of heat and pressure, the assembly is fused together and the bolt rope becomes substantially an integral part of the sail. For lighter duty, not requiring the added reinforcement, the luff edge itself of sail 28 may be folded about the rope and heat sealed in place.

Figure 6:
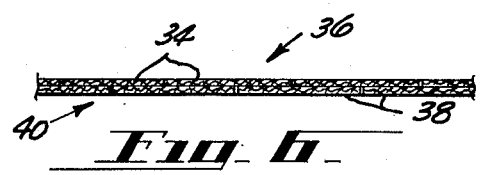
Fig. 6 is a view similar to Fig. 5 showing a modified arrangement of panels.
Figure 9:
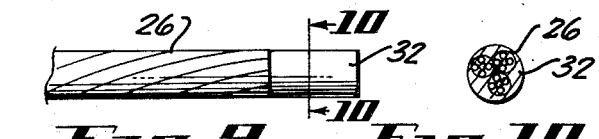
Fig. 9 is a plan view of an end portion of a rope treated to prevent raveling in accordance with one of the teachings of the invention.
Figure 10:
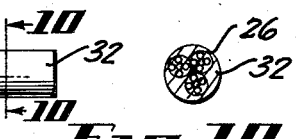
Fig. 10 is a sectional view taken on line 10—10 of Fig. 9.

Figs. 9 and 10 illustrate the application of "Vinylite" and the like in bonding the free ends of ropes to prevent raveling. Fig. 9 shows an end portion of a rope 26, the extreme end of which has been impregnated with such a compound 32. The material is forced into and between the fibers and, as indicated in section in Fig. 10, it bonds the strands and fibers together tightly and permanently, preventing any possibility of raveling. In the preparation of the bolt rope, the entire length may be treated in this manner.

Where an unusually strong sail is needed it is possible, by practicing this invention, to use a plurality of thicknesses of relatively light and flexible material rather than a single thickness of very heavy and relatively stiff material. The sectional view shown in Fig. 6, in which the panel thickness is exaggerated for clarity, indicates how each panel 34 of one layer 36 overlies one half of each of two panels 38 in the other layer 40. By using this construction a sail is produced having a perfectly smooth surface on both sides in place of the pronounced ridges found at the joints of conventional sails. In accomplishing this construction the entire surfaces of the panels are provided with a coating of heat sealing material and, by the application of heat and pressure, the entire sail is fused into a homogeneous article having a very smooth surface and a correct aerodynamic contour permanently built in.

Fig. 11 illustrates a variation of the construction just described. In this case a spinnaker, shown in elevation, is made up of two main sections 42, 44 joined together along line 46. Each section is composed of several panels 48 arranged generally parallel to each other, comprising one layer, and a second group of panels 50 arranged generally parallel to each other but substantially at a 45° angle to the panels of the first group. The panels are coated thruout with heat sealing material, laid in their proper relative positions over a form and fused into a integral sheet. In this arrangement the panels of at least one layer are preferably overlapped as in Fig. 5 to insure that there will be no air leakage at the intersection of two intersecting pairs of panels. Figs. 12 and 13 illustrate the contours of the spinnaker of Fig. 11. By producing a spinnaker over a three dimensional form as described hereinabove it is possible for the first time to obtain a smooth, correct curvature which will develop the maximum thrust under given wind conditions.

The attachment of lines to the corners of sails produces very high concentrated strains at these points and the conventional mode of distributing these strains is to provide boards or plates of some rigid material, such as wood, which are attached to the respective corners by sewing them into "patch pockets" or by placing a board on each side of the sail and bolting them together. The present invention contemplates a novel method of reinforcing the corners of the sails.

Figure 8:
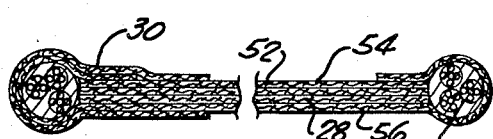
Fig. 8 is a sectional view taken on line 8—8 of Fig. 2.

As best indicated in Fig. 8, this method consists in providing one or more layers 52, 54, 56 of the same material as the body of the sail in addition to the panel itself 28. These layers, which are coated with heat sealing material, are laid over the panel or panels constituting a corner of the sail and are then fused together to form a unitary mass. Because of the substantial thickness of the plurality of layers and the stiffness of the sealing material, a strong and comparatively rigid corner is produced. The strains from a line attached to such a corner are obviously more evenly and generally distributed to the body of the sail than is possible with prior constructions. As illustrated in Fig. 8, the layer 56 overlies and is bonded to the bolt rope on both the luff and the leech edges. The reinforcement 30 is then folded over the assembly and bonded thereto.

Fig. 14 illustrates a jib made up in accordance with the teachings of the present invention. This sail is composed of two principal sections 52 and 54 with the panels of one section arranged at slightly more than 90 degrees to the panels of the other section. A bolt rope is incorporated with the luff edge in the manner described above and is provided with eyes or clevises at its ends for attachment to the mast and the bow. The head, tack, and clew are built up of a plurality of layers of material in the general manner described with reference to Fig. 8. The contours of the sail in the direction of the principal axes are illustrated in Figs. 15 and 16.

The method described herein has been found to reduce the time required for making a sail of any given size by at least half and to produce with certainty a predetermined contour in the sail. The material and character of the construction result in a sail which is integral throughout and which, as a consequence, is substantially stronger and more durable than prior art constructions.

It will be apparent that various changes and modifications in the method and construction of the invention may be made by those skilled in the art, and it is intended that all such changes and modifications shall be encompassed within the scope of the following claims.

We claim:

1. The method of constructing a sail comprising the steps of: providing a form having substantially the finished dimensions of the sail to be constructed thereon and having a predetermined three-dimensional curvature; laying a plurality of panels thereon in edge-overlapping relationship to each other; uniting the overlapping panels to produce an integral sheet having the configuration of said form; and thereafter removing said sheet from said form.

2. The method of attaching an elongated filamentary strand to a margin of a sail comprising the steps of: applying tension to said strand to elongate it; impregnating said strand with heat sealing material while said tension is being applied and hardening said material to retain said strand elongated; placing said strand in juxtaposition to said margin; and applying heat and pressure to said strand and said margin to integrate them while said strand is held elongated by said material.

3. A sail comprising: a plurality of panels of glass cloth; and means to join said panels together integrally; said panels being so shaped individually and joined in such relationship as to produce an unbraced flexible sheet having a thickness of between about one and two times the thickness of a single panel and having a built-in, predetermined three-dimensional curvature.

4. A sail comprising: a plurality of panels of glass cloth laid in substantially parallel edge to edge relation; a second plurality of panels of glass cloth laid in substantially parallel edge to edge relation and overlying said first plurality of panels; the panel edges in said two layers being laterally offset; and means uniting all of said panels into an integral sheet.

5. A sail comprising: a plurality of panels of glass cloth laid with their principal axes in substantially parallel relation with their edges in contact; a second plurality of panels of glass cloth laid with their principal axes in substantially parallel relation with their edges in contact; the first plurality of panels overlying the second plurality of panels; the principal axes of the panels in the two layers being arranged at an angle to each other substantially less than 90 degrees; and means uniting all of said panels into one integral sheet.

6. The method of constructing a sail comprising the steps of: providing a substantially rigid form having substantially the finished dimensions of the sail to be constructed thereon and having a convex working surface of predetermined three-dimensional curvature; laying a panel of sail cloth thereon at a desired angle to the edges of the form; tensioning said panel to cause it to conform to the curvature of that portion of the form which it overlies; laying a second panel on said form in substantially parallel, edge-contacting relation to said first panel; tensioning said second panel to cause it to conform to the curvature of that portion of the form which it overlies; uniting the panels along their line of contact; applying and joining additional panels in the same manner until a single sheet is produced having substantially the predetermined curvature and dimensions of the finished sail and thereafter removing said sheet from said form.

7. The method of attaching a tension strand to a margin of a sail comprising the steps of: stretching said strand; impregnating said strand with heat sealing material and hardening said material while said strand is stretched; applying heat sealing material to said margin; placing said strand in juxtaposition to said margin; folding a narrow elongate strip of fabric over said strand into overlapping relation with both faces of said margin; and applying heat and pressure to the assembly while said strand is still in stretched condition to fuse the elements into an integral unit.

8. A sail comprising: a plurality of panels individually shaped and related to each other to provide a three dimensional curvature; said panels being joined together at the adjacent overlapping edges of said panels; the lines of jointure of each pair of panels being substantially coincident with the line of juncture of said curved surface with one of a plurality of planes arranged parallel to each other and substantially perpendicular to the plane containing the corners of said sail.

DONALD W. GARDINER.
WILLIAM W. SLATER.

REFERENCES CITED

The following references are of record in the file of this patent:

UNITED STATES PATENTS

| Number | Name | Date |
|---|---|---|
| 307,952 | Jones | Nov. 11, 1884 |
| 397,589 | Cutler | Feb. 12, 1889 |
| 1,361,971 | Dickey | Dec. 14, 1920 |
| 1,444,959 | Dickey | Feb. 13, 1923 |
| 1,580,110 | Bazzoni | Apr. 13, 1926 |
| 1,976,257 | Harper | Oct. 9, 1934 |
| 2,167,634 | Calvert | Aug. 1, 1939 |
| 2,193,513 | Hempel et al. | Mar. 12, 1940 |
| 2,244,282 | Bergstein | June 3, 1941 |
| 2,252,539 | Adams | Aug. 12, 1941 |
| 2,259,560 | Glidden | Oct. 21, 1941 |
| 2,275,159 | Nye | Mar. 3, 1942 |
| 2,312,567 | Lyon | Mar. 2, 1943 |
| 2,411,497 | Barnes | Nov. 26, 1946 |
| 2,414,125 | Rheinfrank | Jan. 14, 1947 |
| 2,417,586 | Crosley, 3d | Mar. 18, 1947 |
| 2,419,922 | Tippetts | Apr. 29, 1947 |
| 2,432,662 | Gardner | Dec. 16, 1947 |